US00RE33875E

United States Patent [19]

Tsuchiya

[11] E Patent Number: Re. 33,875

[45] Reissued Date of Patent: Apr. 7, 1992

[54] SPREAD-SPECTRUM COMMUNICATION SYSTEM

[75] Inventor: Masahiro Tsuchiya, Tokyo, Japan

[73] Assignee: Clarion Co., Ltd., Tokyo, Japan

[21] Appl. No.: 376,394

[22] Filed: Jul. 6, 1989

Related U.S. Patent Documents

Reissue of:

[64] Patent No.: 4,691,326
Issued: Sep. 1, 1987
Appl. No.: 722,720
Filed: Apr. 11, 1985

[30] Foreign Application Priority Data

Apr. 17, 1984 [JP] Japan ..... 59-77789

[51] Int. Cl.[5] ..... H04L 27/30

[52] U.S. Cl. ..... 375/1; 375/96; 364/819

[58] Field of Search ..... 375/1, 96, 115, 116; 340/825.63; 364/819, 821, 825

[56] References Cited

U.S. PATENT DOCUMENTS

| | | | |
|---|---|---|---|
| 3,706,933 | 12/1972 | Bidell et al. | 375/96 |
| 4,203,002 | 5/1980 | Nossen | 375/116 |
| 4,203,071 | 5/1980 | Bowles et al. | 375/1 |
| 4,300,235 | 11/1981 | Outram | 375/1 |
| 4,506,239 | 3/1985 | Cho et al. | 375/96 |
| 4,538,281 | 8/1985 | Rajan | 375/1 |
| 4,592,009 | 5/1986 | Masheff | 375/96 |

FOREIGN PATENT DOCUMENTS 58-131840 8/1983 Japan .

OTHER PUBLICATIONS

D. Brodtkorb et al.; *Fast Synchronization In A Spread-Spectrum System Based On Acoustoelectric Convolvers;* 1978 Ultrasonics Symposium Proceedings; pp. 561-566.

P. Baier et al.; *A Novel Spread-Spectrum Receiver Synchronization Scheme Using A Saw-Tapped Delay Line;* IEE Transactions On Communications; vol. Com-30; No. 5, May 1982; pp. 1037-1047.

*Primary Examiner*—Douglas W. Olms
*Assistant Examiner*—Ralph Smith
*Attorney, Agent, or Firm*—Wallenstein, Wagner & Hattis, Ltd.

[57] ABSTRACT

A receiver in a spread-spectrum communication system is adapted to receive a signal which is modulated by a binary code modulated by a binary code or a data, and includes a matched filter which detects a correlation between the received signal and a reference signal modulated by a reference code produced by a code generator. When the received code supplied from the matched filter coincides with or is slightly displaced from the reference code, a pulse is produced from a correlation spike waveform with a relatively large amplitude to extract a desired pulse from the pulse and use it to initialize the reference code generator.

2 Claims, 5 Drawing Sheets

SPREAD-SPECTRUM COMMUNICATION SYSTEM

Matter enclosed in heavy brackets [ ] appears in the original patent but forms no part of this reissue specification; matter printed in italics indicates the additions made by reissue.

FIELD OF THE INVENTION

This invention relates to a digital wireless communication system, and more particularly to a spread-spectrum communication system wherein the transmitter modulates a carrier by a binary code modulated by data, instead of directly modulating the carrier by the data, so that the signal arriving at a receiver's end is received via a matched filter.

BACKGROUND OF THE INVENTION

In such a spread-spectrum communication system, a carrier is modulated by a pseudo-noise code (hereinafter called PN code) which is a binary code and also is modulated by data, as shown in FIG. 1(A). In FIG. 1A, reference numeral 1 designates a data source, 2 is a modulator, 3 is a PN code generator, 4 is a carrier wave generator, 5 is a modulator, and 6 is a transmitter. At a receiver's end, as shown in FIG. 1(B), a matched filter detects a correlation between the arriving signal and a reference PN code therein so that when both the codes coincide or are slightly displaced, an autocorrelation waveform (hereinafter called "correlation spike waveform") with a relatively large amplitude is processed and demodulated into the data. In FIG. 1B, reference numeral 7 refers to a receiving antenna, 8 is a correlator, 9 is a reference PN code generator, 10 is a data demodulator, and 11 is a data stream.

A convolver is used as a matched filter. A convolver in general is a functional unit to effect a convolution integral, but may be a matched filter to effect a correlation operation if a binary reference code (hereinafter called "reference code") is the time-reversed image of the received code.

A surface acoustic wave convolver (hereinafter called "SAW convolver") is referred to as one type of convolver. The industry provides different structures of SAW convolvers, i.e., a lamination of a piezoelectric substance and silicon spaced by a gap, a combination of a piezoelectric substance and silicon united via an oxide layer, a single body of a piezoelectric substance, etc. They all have nonlinear properties and perform a correlation operation of two signals by use of an interaction therebetween, the result of which is integrated by a gate electrode provided in an interaction region.

FIG. 2 shows a construction of a SAW convolver. Reference numerals 12 and 13 are transducers, 14 is a piezoelectric substance, 15 is an oxide layer, 16 is a silicon substrate, and 17 is a gate electrode. A signal s(t) entered from the transducer 12 travels to the right in the Figure, and a signal r(t) entered from the transducer 13 travels to the left. Since the construction comprising the piezoelectric layer, oxide layer and silicon has a nonlinear property, an interaction occurs between the signals s(t) and r(t) to cause the correlation operation and integrate the result therefrom in the gate electrode 17.

A signal c(t) produced by the gate electrode 17 is expressed by:

$$c(t) = A\int_{t-T}^{t} r\left(t - \frac{x}{v}\right)s\left(t - T + \frac{x}{v}\right)d\frac{x}{v}$$

Where A is a constant, T is the time required for an acoustic wave to pass under the gate electrode (hereinafter called "under-gate delay time"), x is the propagation distance of the signal s(t), and s is the sonic speed.

A PN code in general has a given cycle. In formation of a waveform at the transmitter's end, it is often employed to correlate one cycle of the PN code with one bit length of the data. For a better explanation or understanding, the instant description takes an example where one cycle of the PN code equals the length of one data bit.

The relationship between the under-gate delay time and the PN code may be selected as desired. Namely, the under-gate delay time may be shorter, equal or longer with respect to one cycle of the PN code. The under-gate delay time means the integral period in the correlation operation. The integral period preferably equals one cycle of the PN code, considering the correlation characteristics of the PN code. The instant description takes an example where the under-gate delay time equals one cycle of the PN code.

The above-cited relationships are shown FIGS. 3A, 3B, and 3C. FIG. 3A shows a data bit, and FIG. 3B shows an arrangement of the PN code. The FIGS. 3A and 3B show that the length l of one data bit equals one cycle of the PN code. FIG. 3C is a diagrammatic cross-sectional view of a convolver wherein the delay time in the length L of the gate electrode equals l. Here again, the illustrated arrangement is simply an example, and any relationship may be selected between one data bit, one cycle of the PN code and the under-gate delay time.

In practical communication, the receiver always stands by for reception, with the reference signal entered in one of the transducers. When a signal is received, it is supplied from the other transducer to the convolver. If the PN codes involved in the received signal coincides with the reference signal, the gate electrode of the convolver provides a correlation spike waveform. However, it is still unknown in which position the both codes are aligned. The data is not demodulated into its proper form unless the alignment is established at a proper position. For example, if both the codes are aligned at the position shown by FIG. 4A, the received PN code is shared half and half by data bits A and B. In FIGS. 4A and 4B, D shows a data bit, R shows the received PN code, RP shows the reference PN code, and L shows the region under the gate electrode where the interaction occurs. $\overline{A}$ is the time-reversed PN code of the PN code A.

As described above, some means is necessary to finally make both the codes coincide at the position of FIG. 4B if they first coincide in any other position. The first coincidence of both the codes after reception of the arriving signal and until the coincidence at the position of FIG. 4B is called "primary synchronization" in this text. Although the primary synchronization is out of the scope of the present invention, it is described in a report by D. Brodtkorb and J. E. Laynor entitled "Fast synchronization in a spread-spectrum system based on acoustoelectric convolvers" and printed in pages 561 through 566 of 1978 Ultrasonics Symposium Proceedings, IEEE Cat. No. 78CH1344-ISU.

After the primary synchronization is established, and the placement of FIG. 4B is once obtained, a possible difference between the clock frequency of the received PN code and the clock frequency of the reference PN code gradually displaces the alignment position from the placement of FIG. 4B. The displacement at every instant of encounter of the heads of the received and reference PN codes is expressed by:

$$\frac{vN}{2fr} \, |1 - fr/ft| \, [m]$$

where $fr$ is the clock frequency of the reference PN code, $ft$ is the clock frequency of the received PN code, and N is the number of chips in one cycle of the PN code.

Regardless of the primary synchronization, a possible difference between the clock frequencies of both the codes gradually displaces the alignment position from the proper placement and disables demodulation of the data. This means that clock oscillators with an exactly uniform clock frequency must be provided in the transmitter and the receiver. Such clock oscillators are normally based on quartz oscillators. However, it is extremely difficult to manufacture a plurality of quartz oscillators with an exactly uniform frequency. Besides this, they require a strict control of the environment such as temperature and humidity.

The report by D. Brodtkorb et al. discloses how to overcome the problem. They use a counter to detect the displacement and shift time base of the reference PN code so as to cure the displacement. The misalignment correction and subsequent maintenance of the perfect alignment at the proper position are called "synchronization maintenance" in this text. The proposal by D. Brodtkorb et al., however, has a drawback in that the signal processing is complicated because it requires operation to drive or stop the counter.

OBJECT OF THE INVENTION

It is therefore an object of the invention to provide a spread-spectrum transmitter/receiver system only requiring a simple signal processing to establish an operable condition and not requiring any additional operation to drive or stop a counter, for example.

SUMMARY OF THE INVENTION

In accordance with the invention, there is provided a receiver in a spread-spectrum communication system adapted to receive a signal which is modulated by a binary code modulated by a binary code or data, and including a matched filter for detecting a correlation between the received signal and a signal modulated by a reference binary code, said receiver comprising:

first means for producing a correlation spike pulse from an correlation waveform signal with a relatively large amplitude when said binary code in said received signal supplied from said matched filter coincides with or has a small displacement from said reference binary code;

second means for selectively extracting a desired correlation spike pulse from a plurality of said correlation spike pulses from said first means and producing a reset pulse therefrom; and a code generator for producing said reference binary code and initialized by said reset pulse.

The invention will be better understood from the description given below, referring to preferred embodiments illustrated in the drawings.

DETAILED DESCRIPTION OF THE PREFERRED EMBODIMENTS

In a preferred embodiment of the invention, a means employed to produce a reset pulse from the above-referred correlation spike wave comprises: an amplifier which amplifies a signal having the correlation spike waveform; an envelope detector which extracts an envelope signal in the amplified waveform; a threshold detector which compares the amplitude of the envelope signal with a predetermined threshold and produces an output pulse responsive to the result of the comparison; a wave shaping circuit which shapes the output pulse from the threshold detector into a pulse with a predetermined width; a gate pulse generating circuit which produces a gate pulse from a pulse synchronizing the reference PN code; and a gate circuit which selectively extracts the pulse from the wave shaping circuit responsively to the gate pulse from the gate pulse generating circuit. The matched filter is preferably a surface acoustic wave (SAW) convolver. In second preferred embodiment of the invention, the binary code involved in the received signal and the signal modulated by the reference binary code are both phase-modulated signals. The binary code may preferably be a PN code. In third preferred embodiment of the invention, if the matched filter is a two-gate convolver which has two gate electrodes provided on a single substrate, the envelope detector extracts an envelope through a low pass filter after detecting phases of correlation spikes produced concurrently from both of the gate electrodes.

Figure 1A:
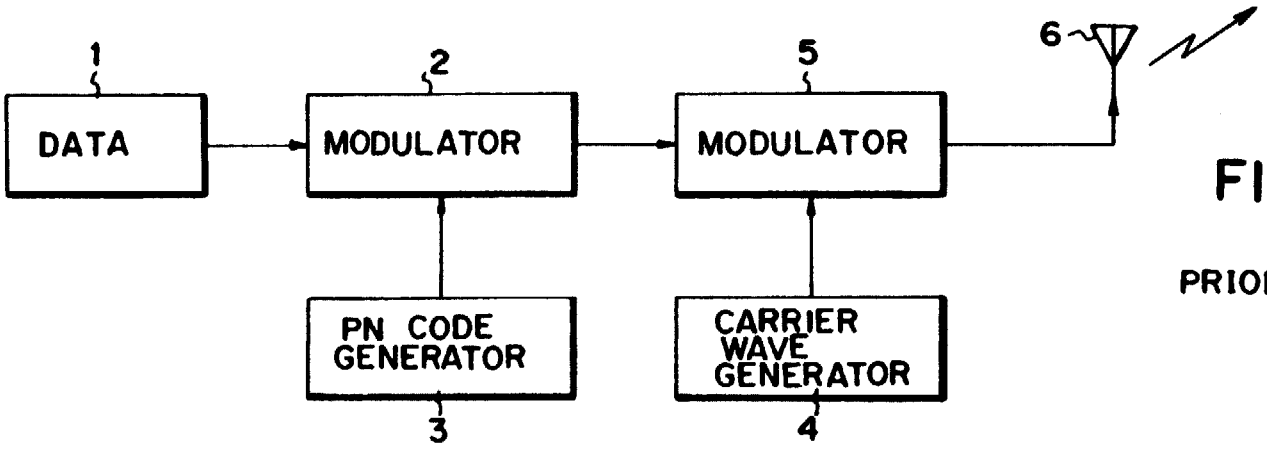
FIG. 1A PRIOR ART
FIGS. 1B and 1A are block diagrams of a transmitter and a receiver respectively in a prior art spread-spectrum communication system.
Figure 1B:
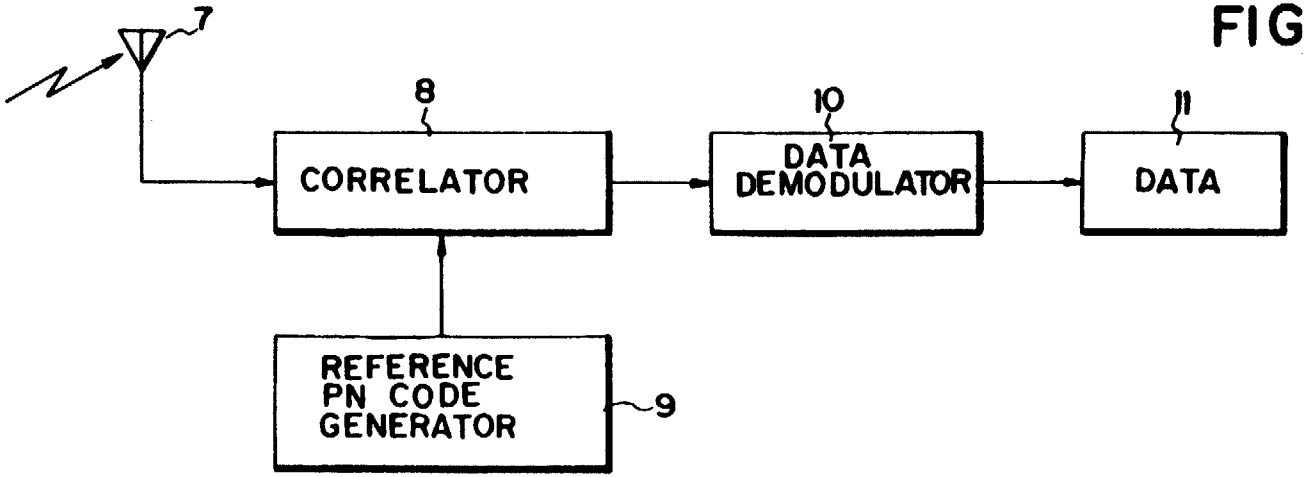
Figure 2:
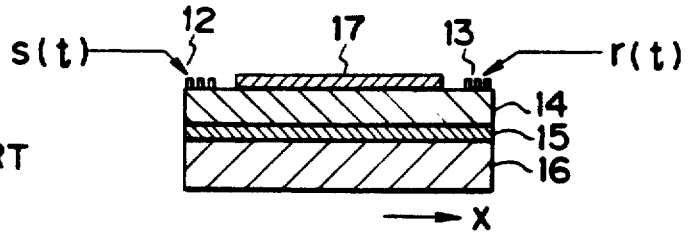
FIG. 2 PRIOR ART
FIG. 2 is a cross-sectional view of a convolver.
Figure 3A:
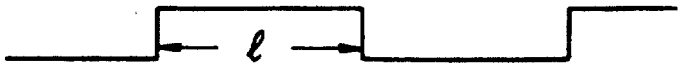
FIG. 3A PRIOR ART
FIGS. 3A and 3B are timing element chart showing placements of a data bit in FIG. 3A and a PN code in FIG. 3B related to a gate electrode of a convolver in FIG. 3C.
Figure 3B:
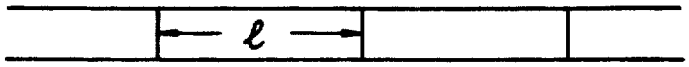
Figure 3C:
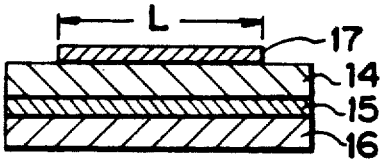
Figure 4A:
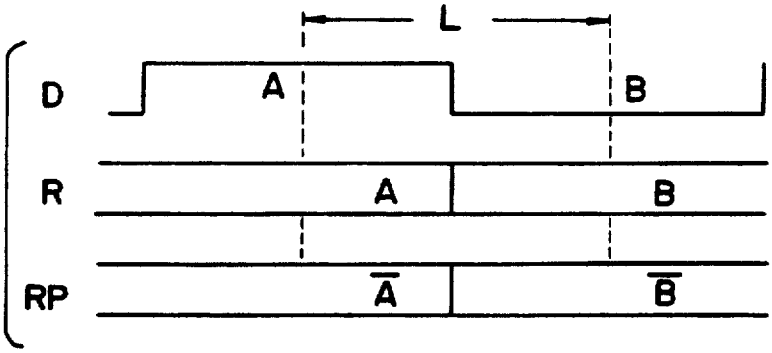
FIGS. 4A and 4B are timing diagrams showing a misalignment and a proper alignment of a received PN code and a reference PN code.
Figure 4B:
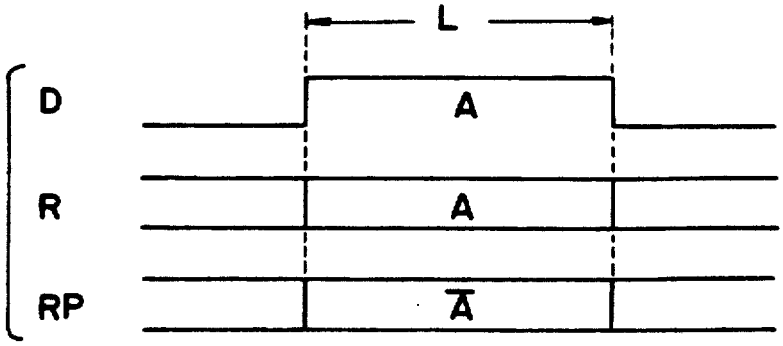
FIG. 4B PRIOR ART
Figure 5:
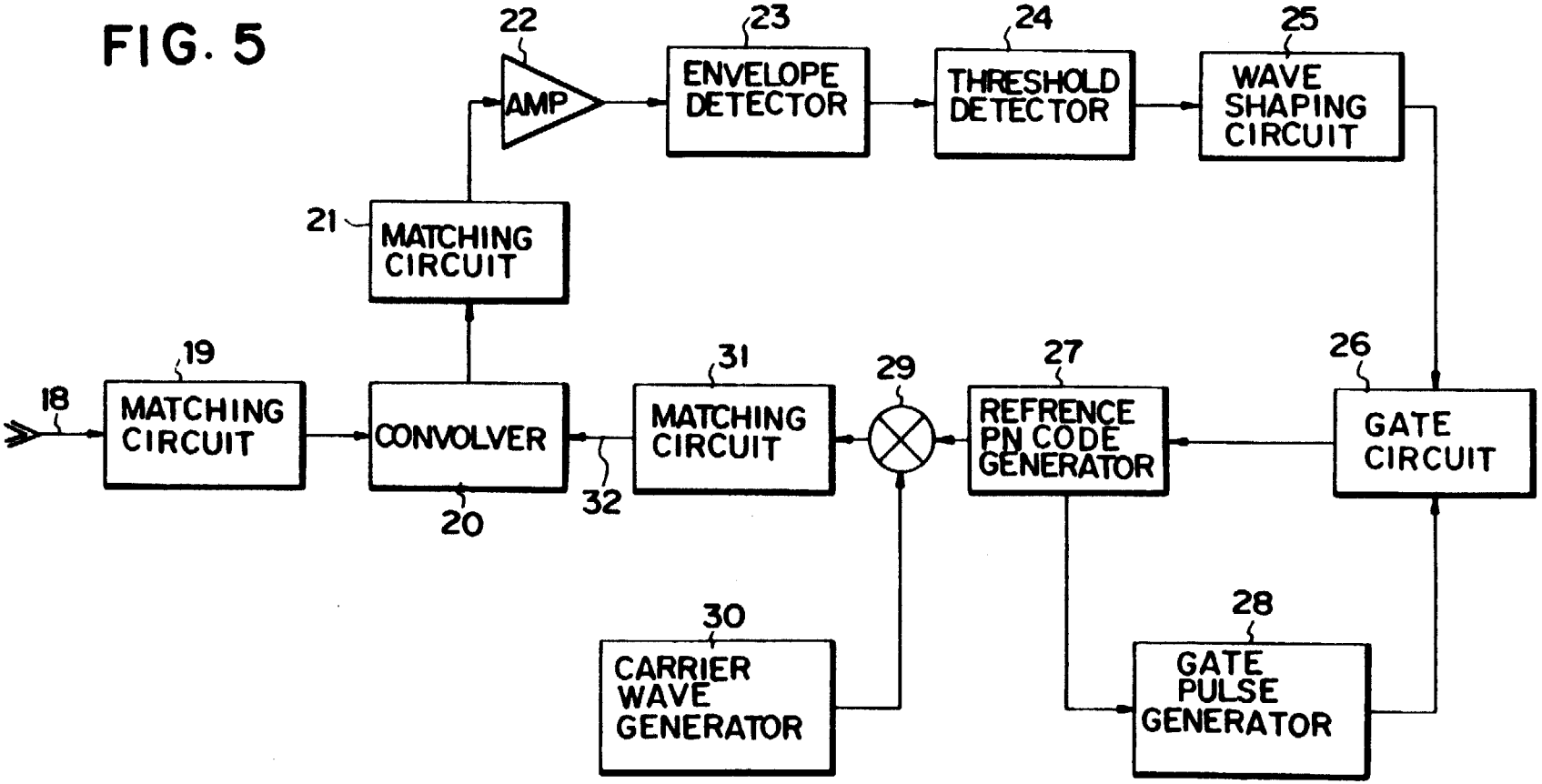
FIG. 5 is a block diagram of a receiver in a spread-spectrum communication system embodying the invention.
Figure 6A:
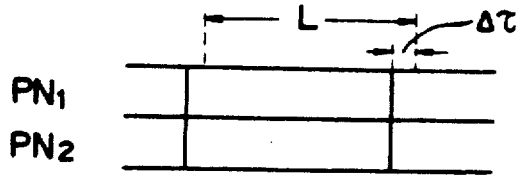
FIGS. 6A–6D are timing diagrams showing different alignment conditions of the received PN code and the reference PN code.
Figure 7A:
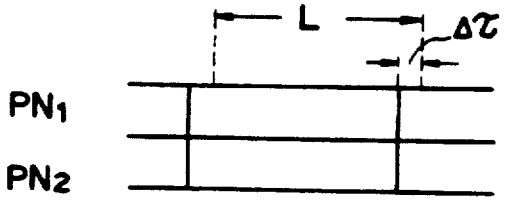
FIGS. 7A and 7B are timing diagrams showing different alignment conditions of the received PN code and the reference PN code.
Figure 7B:
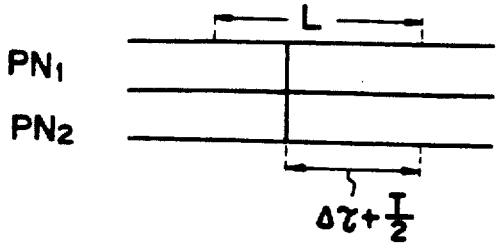

FIG. 5 is a block diagram of a receiver in a spread-spectrum communication system embodying the invention. Assume now that the carrier of a received signal 18 is two-phase modulated. The received signal 18 is supplied to one of the transducers of a convolver 20 via an impedance matching circuit 19. A PN code produced by a reference PN code generator 27 two-phase modulates a sine wave produced by a carrier generator 30 in a mixer 29. The modulated signal is supplied to the other transducer of the convolver 20 via an impedance matching circuit 31 and serves as a reference signal 32. Thus, the primary synchronization is established between the PN codes related to the received signal and the reference signal entered in the convolver 20, thus representing an alignment as shown in FIG. 4B, for examle. Here assume that a difference exists between their clock frequencies that gradually displaces the position of the alignment to a position shown in FIG. 6A where the upper waveform shows the received PN code $PN_1$, the lower waveform shows the reference PN code $PN_2$, and $\Delta\pi$ is a displacement between the alignment position of the two codes and an interaction region under the gate electrode. A correlation spike waveform then produced by the gate electrode is entered in the amplifier 22 via the impedance matching circuit 21 and is amplified therein. The envelope detector 23 subsequently extracts an envelope of the spike. The threshold detector 24 compares the extracted envelope waveform with a predetermined threshold and produces a pulse when the extracted waveform is larger than the threshold. The wave shaping circuit 25 shapes the pulse into a pulse with a predetermined width. Here the pulse obtained by the procession of the correlation spike waveform is known as a "correlation pulse". Since the received signal and the reference signal travel in the opposite directions, they are aligned in two positions shown in FIGS. 7A and 7B. Therefore, some arrangements of the data provide two correlation pulses in one cycle of the PN code. The gate circuit 26, however, extracts only one of the correlation pulses responsive to the alignment with a less or smaller displacement as shown in FIG. 7A. The extraction is effected by detecting the correlation pulse and a gate pulse produced in the gate pulse generator 28. The gate pulse generator produces the gate pulse by processing a pulse which is generated by the reference PN code generator 27 and synchronizes the PN code.

Figure 6B:
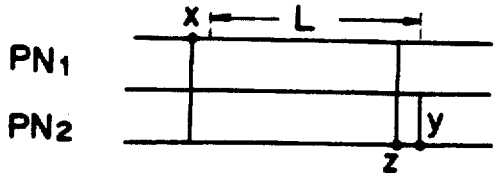
Figure 6C:
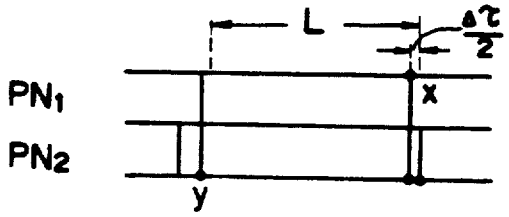
Figure 6D:
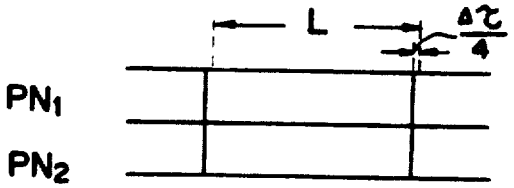

The extracted correlation pulse is used as a reset pulse to initialize all the shift registers constituting the reference PN code generator. Thus the reference PN code is started from the beginning. This is shown in FIG. 6B. In FIGS. 6B, 6C, and 6D, the upper waveforms show the received PN code $PN_1$ the lower waveforms show the reference PN code $PN_2$, y is the point where the reference PN code is started again, and z is the leader of the reference PN code before initialization. The alignment shown in FIG. 6C shows that the two codes are aligned after a point x designating that the head of the received PN code moves to the right by one cycle from the position in FIG. 6B.

At this time, the displacement from the proper position is reduced to about a half. The displacement is further reduced to a quarter as shown in FIG. 6D by another similar operation, using the last obtained correlation pulse.

With continuous, repeated performance of the displacement correcting operation, the invention device can maintain the synchronization.

Figure 8:
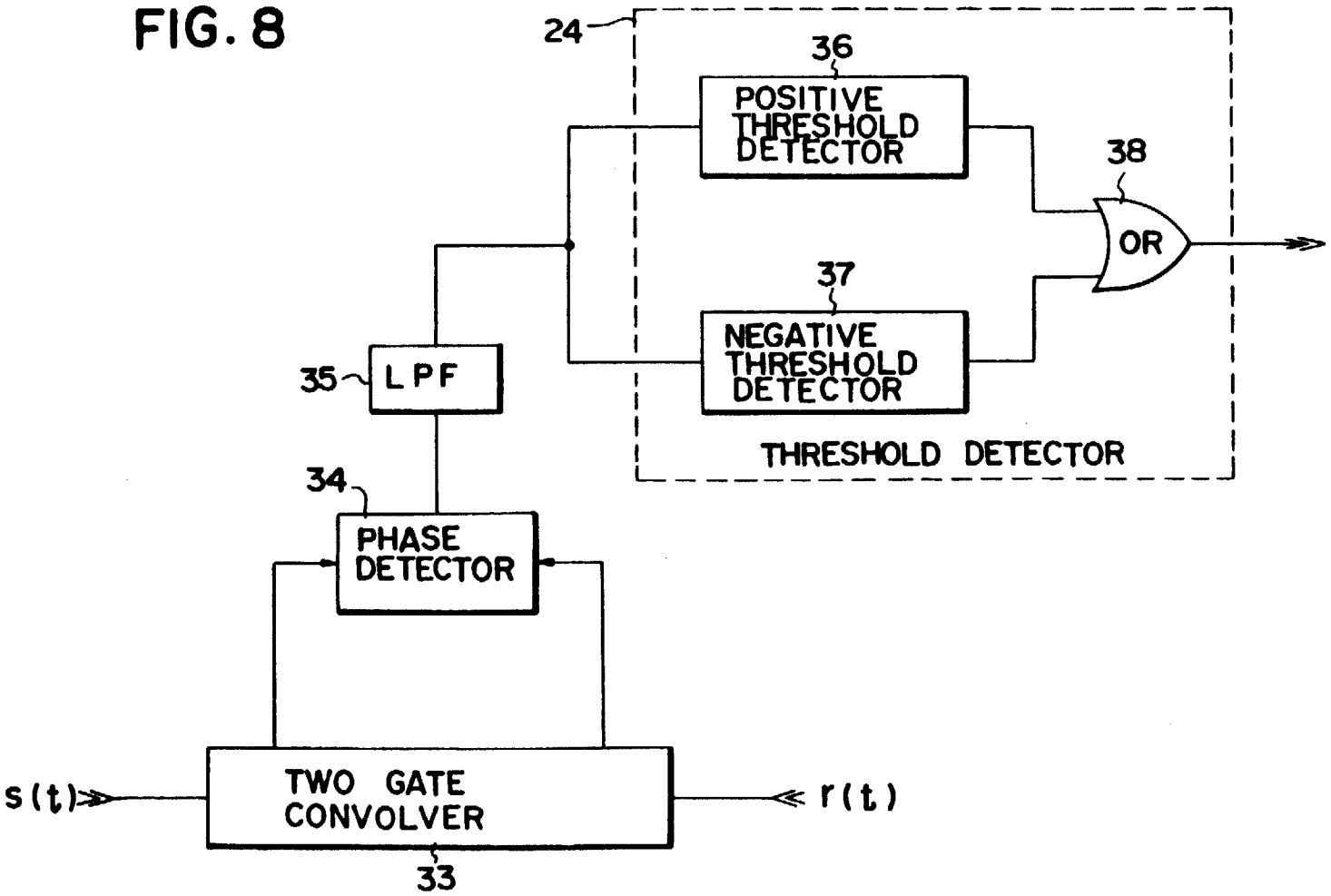
FIG. 8 is a block diagram of a modified part of the receiver of FIG. 5, using a two-gate convolver.

A two-gate convolver having two gates provided on a single substrate is often used for reception of a signal whose carrier is phase-modulated by a code which is obtained by a DPSK modulation using data. The use of the two-gate convolver enables extraction of an envelope by a delayed detection. The extracted envelope is processed in the same manner to generate a reset pulse. FIG. 8 shows an example of the use of a two-gate convolver. The reference signal s(t) is entered from the left hand of the two-gate convolver, and the received signal r(t) is entered from the right hand. Reference numeral 34 designates a phase detector, 35 is a low pass filter, 36 is a positive threshold detector, 37 is a negative threshold detector, and 38 is a logic OR circuit which produces an output to be applied to the wave shaping circuit 25.

As described above, the invention does not use any counter, and reliably maintains the synchronization by a simple signal processing.

The embodiments of the invention in which an exclusive property or privilege is claimed are defines as follows:

1. A receiver in a spread-spectrum communication system adapted to receive a signal which is *first* modulated by [a] *binary data and thereafter by a* binary code [modulated by a binary code or data], and including a surface acoustic wave convolver for detecting a correlation between the received signal and a signal modulated by a [time-reversed] reference binary code *in the form of a time-reversed replica* of said binary code, said receiver comprising:

first means for producing a correlation spike pulse from a correlation waveform signal with a relatively large amplitude when said binary code in said received signal supplied [from] *to* said surface acoustic wave convolver coincides with or has a small displacement from said reference binary code;

second means for selectively extracting a desired correlation spike pulse from said correlation spike pulses from said first means and producing a reset pulse therefrom; and a code generator for producing said reference binary code and initialized by said reset pulse, wherein said first means include:

an amplifier for amplifying said correlation waveform signal;

an envelope detector for extracting a signal having an envelope waveform in an output signal from said amplifier;

a threshold detector for comparing the amplitude of said envelope waveform signal with a predetermined threshold and generating a pulse responsive to the result of the comparison;

and wherein said second means include:

a wave shaping circuit for shaping said pulse from said threshold detector into a pulse with a predetermined width;

said reference binary code being synchronized by a synchronizing pulse;

a gate pulse generator for generating a gate pulse from said pulse synchronizing said reference binary code; and a gate circuit responsive to said gate pulse to selectively extract said pulse supplied from said wave shaping circuit.

*2. A receiver in a spread-spectrum communication system adapted to receive a signal which is first modulated by binary data and thereafter by a binary code, and including a surface acoustic wave convolver for detecting a correlation between the received signal and a signal modulated by a reference binary code in the form of a time-reversed replica of said binary code, said receiver comprising:*

*first means for producing a correlation spike pulse from a correlation waveform signal with a relatively large amplitude when said binary code in said received signal supplied to said surface acoustic wave convolver*

*coincides with or has a small displacement from said reference binary code;*

*second means for selectively extracting a desired correlation spike pulse from said correlation spike pulses from said first means and producing a reset pulse therefrom; and*

*a code generator for producing said reference binary code and initialized by said reset pulse.*

* * * * *